April 21, 1964     J. R. FITZPATRICK     3,129,911

FRAMEWORK FOR RIGID AIRCRAFT

Filed Jan. 31, 1962     2 Sheets-Sheet 1

INVENTOR.
JOHN R. FITZPATRICK
BY *Albert S Perry*
ATTORNEY

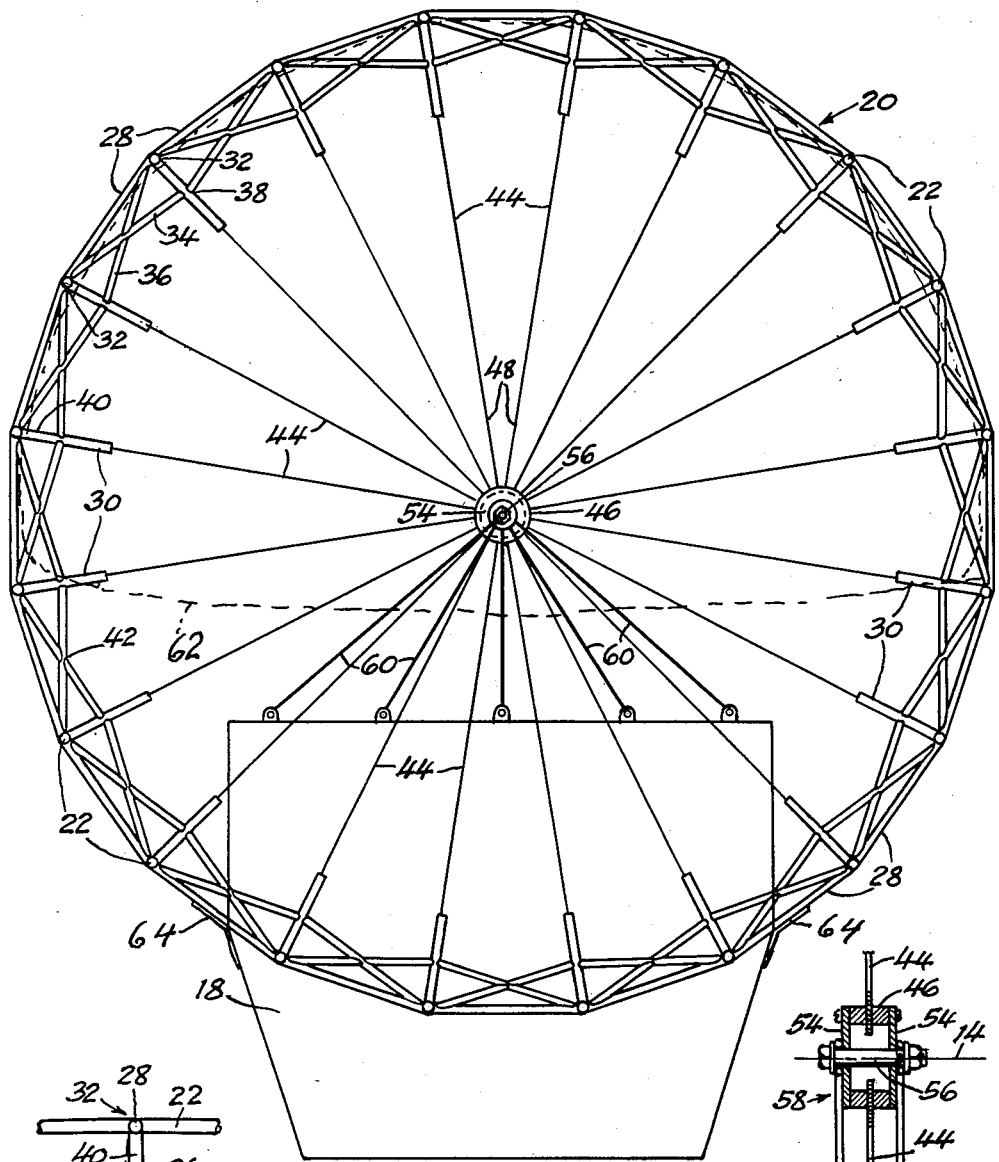

United States Patent Office 3,129,911
Patented Apr. 21, 1964

3,129,911
FRAMEWORK FOR RIGID AIRCRAFT
John R. Fitzpatrick, Levittown, Pa., assignor to Aereon Corporation, King of Prussia, Pa.
Filed Jan. 31, 1962, Ser. No. 170,068
9 Claims. (Cl. 244—125)

This invention relates to "lighter-than-air" craft and is directed particularly to "rigid-type" airships and to framework and other means by which the strength, safety and operating characteristics of the craft may be improved while its weight may be reduced.

Rigid-type airships generally have an elongated or "cigar-shaped" body or envelope characterized by its aerodynamic efficiency. A plurality of cells containing buoyant gas are then located within the envelope and distributed lengthwise thereof. However, the desired shape of the envelope is maintained and the necessary support for the power plants, control cabin and freight and passenger loading are provided by means of a framework structure enclosed within the envelope. Such a framework must possess sufficient strength and stiffness to assure safety and support for the load to be carried under all conditions of weather and operation to which the airship may be subjected. At the same time, the framework should be as light as possible since its weight must be offset by the addition of sufficient buoyant gas in the envelope to support the framework, which in turn, calls for an increase in size of the airship.

The framework structures heretofore employed have included ring-shaped assemblies centered with respect to the longitudinal axis of the envelope and held in place by one or more relatively heavy and stiff "keels" and other longitudinally extending members. The ring-shaped assemblies in particular must be strengthened or reinforced to preven distortion or elongation thereof in a vertical direction when subjected to the upwardly directed lifting force of the buoyant gas in the envelope and the opposite and downwardly directed force of gravity exerted by the load carried by the airship. As a result, the ring-shaped assemblies are generally formed of multiple internal and external rings, means having trusses or other bracing members therebetween.

Furthermore, the whole ship and its framework are subjected to strains and distortion, and maneuvering of the ship is rendered more difficult by reason of the fact that the propellers or other propulsion means employed cannot be effectively mounted adjacent the axis of the airship envelope when the ring-shaped framework assemblies of the prior art are employed. The propulsion means must instead be mounted on or adjacent the keels or the lower portion of the airship envelope whereby the propulsion forces are applied eccentrically with respect to the envelope and its framework and additional compensating controls and reinforcing means are, therefore, required in the framework in order to overcome the aerodynamic instability and internally induced mechanical stresses developed.

A further objection to the framework assemblies and structures of the prior art results from the necessary increase in strengthening and bracing of the elements whereby the framework becomes more truly "rigid" and is not capable of yielding sufficiently to relieve localized tensions or stresses which may be applied to or develop within the structure during operation.

In accordance with the present invention, such objections and limitations inherent in rigid-type lighter-than-air craft of the prior art are overcome and novel structures are provided whereby the weight of the framework employed may be reduced while its strength may be increased. Moreover, the manner in which the load and forces are applied to the framework may be controlled so as to reduce or eliminate those conditions which tend to distort or to impose unequal or eccentrically applied forces to the airship.

These results are preferably attained by employing ring-shaped assemblies in the framework which are provided with centrally located load-receiving and distributing means positioned on or adjacent the longitudinal axis of the envelope. The load-receiving means may then be supported from the periphery or outer portion of the ring-shaped assembly by means of extremely light weight but strong tension elements such as wires, and distortion of the ring-shaped assemblies may be prevented. Moreover, such framing elements and assemblies render it possible to locate the propeller or other propulsion means for the airship on or adjacent the longitudinal axis of the envelope whereby the aerodynamic characteristics of the craft are improved and the strains imposed on the framework are balanced more effectively.

Accordingly, the principal objects of the present invention are to improve the construction, design and operation of rigid-type lighter-than-air craft, to provide novel framework elements and combinations which possess increased strength and reduced weight as compared to the framework structures of the prior art, and to improve the operaitng characteristics of rigid-type lighter-than-air craft.

A specific object of the invention is to provide a rigid-type lighter-than-air craft with a circular or polygonal framework element designed to be centered with respect to the axis of the envelope of the ship and provided with load supporting and distributing means positioned on or adjacent said axis.

A further specific object of the invention is to provide novel means for mounting and locating the propulsion means for rigid-type lighter-than-air craft.

These and other objects and features of the present invention will appear from the following description thereof wherein reference is made to the figures of the accompanying drawings.

In the drawings:

FIG. 3 is a vertical sectional view of the construction shown in FIG. 2 taken on the line 3—3 thereof and illustrating a preferred type of ring assembly;

FIG. 4 is a side elevation of a portion of the ring assembly of FIG. 3;

FIG. 6 is a vertical sectional view through that form of the concentration ring assembly shown in FIG. 3.

Figure 1:
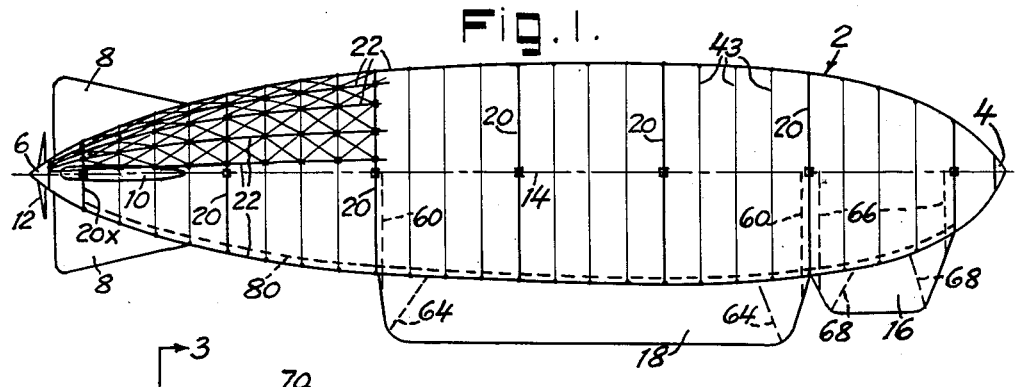
FIG. 1 is a side elevation of a typical form of rigid-type airship embodying the present invention with portions of the envelope broken away.
Figure 2:
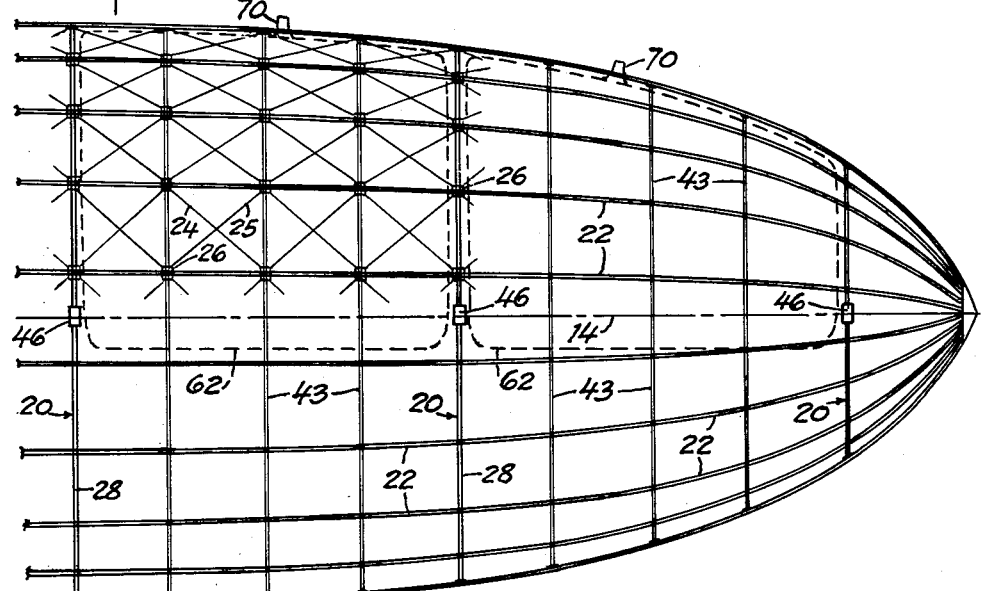
FIG. 2 is an enlarged view of a portion of the construction illustrated in FIG. 1.

In that form of the invention chosen for purposes of illustration in the drawings, the airship is shown as having an outer envelope 2 with a nose cone 4, a tail cone 6, rudders 8, elevators 10 and a propeller or propulsion means 12 mounted on or adjacent the longitudinal axis 14 of the envelope. The airship also may have a control car 16, passenger or cargo compartments 18 or be otherwise constructed in any preferred manner insofar as its general outline and design are concerned. Therefore, the airship of FIG. 1 may be considered to be substantially conventional in its general configuration although no known or successful rigid type airship has ever been produced heretofore wherein the propeller or propulsion means has been mounted on or adjacent the longitudinal axis of the envelope of the airship.

Within the envelope 2, the framework provided embodies ring-shaped assemblies 20 arranged in longitudinally spaced relation concentrically with respect to the axis 14 of the envelope. The ring assemblies 20 are held in place by longerons 22 and by the diagonal bracing wires 24 and 25 which are connected to the ring assemblies and longerons by gusset plates 26 or other fastening means.

A preferred form of the ring assembly 20 is illustrated more fully in FIGS. 3 and 4. As there shown, the ring is, in fact, a many sided polygon, twenty individual side members being provided, each of which serves as a cross brace 28 between two adjacent longerons 22. King posts 30 extend radially inward from the points 32 where the ends of adjacent cross brace members 28 are connected to the longerons 22. Diagonal cross braces 34 and 36 extend from the points 32 to points 38 located midway between the outer ends of the king posts and the inner ends 40 thereof. The diagonal cross braces 34 and 36 are preferably connected together at 42 so that the outer cross braces 28, the king posts 30 and the diagonal cross braces 34 and 36 cooperate to form strong and relatively rigid structures which cooperate in holding the longerons 22 in predetermined, and preferably equally spaced relation circumferentially of the framework at each ring assembly. Intermediate or supplementary ring assemblies consisting of cross bracing elements only may be employed as shown at 43 between the primary ring assemblies 20 in the framework. Moreover, since both the primary ring assemblies 20 and the supplemental ring assemblies 43 differ in diameter at different points throughout the length of the framework, the longerons will not actually be parallel but will serve instead to define the desired cigar-shaped form of the envelope.

The inner end 40 of each of the king posts 30 has a wire, rod or tension member 44 securely connected thereto and extending radially inward therefrom to a central member or concentration ring 46. The opposite ends of the tension members may be secured to the king post and concentration ring by means of right and left hand threads or any other suitable form of connecting means, but the tensioning members are preferably adjustable so that the tension to which each tension member 44 and king post 30 is subjected may be controlled, equalized or varied as desired during construction or as an incident to maintenance or repair of the airship. Such adjustments further render it possible to assure the desired centering or positioning of the concentration ring 46 with respect to the longitudinal axis 14 of the framework and envelope of the airship.

The construction thus provided is very light in weight but is exceedingly strong and balanced so as to be capable of withstanding greatly varying changes in the magnitude and direction of the forces applied thereto. Thus, for example, any tendency for the ring-shaped assembly to be elongated vertically due to the upward thrust of the buoyant gas cells within the framework and the weight or downwardly directed pull of gravity on the load carried by the airship, will serve only to increase the tension applied to the tension members 44 which extend upwardly and downwardly from the concentration ring 46 to the king posts 30 and the longerons 22. To a lesser extent such tension will also be applied to the tension members 44 which extend diagonally from the concentration ring 46 to the king posts and points located throughout the circumference of the ring assembly. In this way, the forces or loads applied to the ring assembly tending to cause distortion thereof will be distributed throughout the ring and localized concentration of any forces or loading is prevented.

The ring assembly thus provided is characterized by a further inherent strength factor serving to maintain the ring a single flat plane and preventing buckling or axial displacement of the elements of the ring. The ring assembly, although very simple in construction and very light in weight, eliminates the need for the heavy and multiple circumferential reinforcing elements, trusses and bracing members and similar construction elements required in the ring assemblies of prior rigid-type aircraft framework.

These advantages of the ring assemblies of the present invention are attained by extending the king posts 30 radially inward a substantial distance beyond the point 38 where the diagonal bracing members 34 and 36 are connected thereto. The king posts then will serve as levers of the second class since their outer ends are fixed in position to serve as fulcrums by reason of their connection to the longerons 22 and the cross braces 28 of the points 32. As a result, any tendency for the diagonal bracing members 34 and 36 to buckle or to be displaced axially, to a position such as that indicated at 30A in dotted lines in FIG. 4, will be opposed by the tension or radially directed inward pull of the tension member 44 and the concentration ring 46. Moreover, the point at which the diagonal braces 34 and 36 will tend to exert a buckling force or axial directed load upon the lever of the king post 30 will be at the intermediate or midpoint 38 where the diagonal braces are connected to the king post. The length of the "resistance arm" of such a second class lever, represented by the distance from the point or fulcrum 32 of the king post to the joint or point of loading 38 of the king post, is, of course, less than, and preferably about one-half, the full length of "effort arm" of the king post lever 30. Therefore, the tension or force required to prevent axial displacement of the inner end 40 of the king post (and buckling of the ring) will be less and preferably no more than one-half the axial directed load or buckling force applied at the intermediate point 38 on the king post. Furthermore, the displacement or distance which the inner end 40 of the king post will move in an axial direction will vary by an amount equal to twice the sine of the angle $\theta$ through which the king post lever is rotated about its fulcrum joint 32. Therefore, since the sine of an angle $\theta$ is relatively small when the angle is small but increases rapidly as the angle increases, the second class lever construction of the king posts permit the assemblies to yield somewhat or move to a limited degree while presenting greatly increased resistance to movement of the king post through a large angle or actual distortion of the ring assembly. The elements of the framework of the airship may, therefore, undergo limited but restrained relative movement so as to relieve or prevent the development of excessive or localized strains in the framework without, however, reducing the actual or effective strength and the essential "rigidity" of the framework.

The airship framework is further reinforced and strengthened by the diagonal bracing wires 24 and 25 which are oppositely inclined with respect to the axis 14 of the airship and have their opposite ends secured to the gusset plates 26. As shown, the gusset plates are preferably welded or otherwise attached to the longerons 22 and the cross braces 28 at the points 32 where they intersect. Additional gusset plates 26 may also be secured to the longerons 22 at the points where the intermediate cross braces or supplemental ring assemblies 43 are located. The gusset plates shown are provided with attaching means such as the elastic stop nuts 52 which are positioned at the corners of the gusset plates and fixedly secured thereto. The diagonal bracing wires then may have the ends thereof oppositely threaded so that they may be readily attached to nuts on the gusset plates by rotation of the wire in one direction. Such rotation also may be used to control or vary the tension applied to the diagonal bracing wires as desired.

With this construction, each diagonal bracing wire may be relatively short and independently connected at its opposite ends to adjacent ring assemblies in the framework. In this way, the diagonal bracing wires serve to connect each ring to an adjacent ring and to the longerons 22 in such a way as to prevent the application of cumulative tensions to an extended length of the diagonal bracing wires. The tension, torque and other stresses are instead transmitted directly from ring to ring in the assembly so as to provide a redundant structure as distinguished from an integral or continuous tensioning or bracing means. All loading and tensions are accordingly distributed throughout the framework so that localized or concentrated overload of individual elements or portions of the assembly is prevented. Moreover, the breaking or loosening of any individual bracing wire will not materially affect the loading of other diagonal bracing wires at remote points in the framework. Therefore, it is possible to employ relatively light-weight diagonal bracing wires or other means without danger of overload under any conditions of usage or operation which the airship may encounter.

The concentration rings 46, which are located adjacent the longitudinal axis 14 of the framework and envelope of the airship, are preferably utilized as an important, if not the principal or sole supporting, means by which the load is carried by the airship. Thus, the concentration ring itself may serve as a load supporting drum, or as shown in FIGS. 3 and 6, the concentration ring may be provided with a cover or bearing plate 54 secured to each of the opposite faces thereof. These bearing plates may then be provided with central openings through which a supporting bolt 56 extends and hangers, cables or other suspension elements 60 are connected thereto for supporting the control cabin, storage chamber, passenger lounges or other load-carrying means. As shown by way of illustration, the cables 60 are provided with connecting members 58 secured at their upper ends to the supporting bolts 56 and the cables extend downward for attachment to connecting members 61 secured to the passenger or cargo compartment 18 located within the envelope near the lower portion thereof. Such a compartment will be positioned below or between helium or other buoyant gas containing cells 62 located in the upper portion of the envelope 2 and between the primary ring assemblies 20 of the framework. The compartment 18 may be braced and held against lateral or longitudinal displacement with respect to the framework of the airship by brackets 64 or other suitable means as desired. However, most, if not all, of the load represented by the compartment and its contents will be supported directly from the concentration rings 46 of one or a plurality of the ring assemblies in the airship framework.

In a similar way, the control car 16 or other cargo, passenger or load-carrying compartments may be located below and on the exterior of the envelope 2 while being supported from the concentration rings 46 by means of cables or connecting means 66. Such a car or compartment can be braced against movement relative to the framework by bracing elements or connecting means 68 or the like.

In any event, the cabin may be located within the outer envelope of the airship for streamlined design and improved aerodynamic effects or it may be positioned below or suspended from the airship envelope is desired. Various other elements or equipment for the airship, such as landing gear and the like, which may be carried in the compartments 16 and 18 or elsewhere and may be raised or lowered with respect to the envelope and airship framework depending upon the nature and use thereof.

The cells 62 which contain the buoyant gas for supporting the airship are located in the bays or compartments between the ring-shaped assemblies 20 of the framework of the airship and provided with vents or safety valves 70. Thus, there may be as many cells 62 as there are compartments between the ring assemblies within the envelope 2 of the airship. However, any one or more of the bays or compartments within the airship frame may be utilized for storage, air or water chambers, pumps, power plants, heat exchangers or other equipment, controls and the like as required for the operation, comfort or convenience of the airship and its load.

The cells 62, of course, do not ordinarily fill the compartments between the ring assemblies 20 but are permitted to expand and contract with changes in pressure, temperature and other conditions of the buoyant gas and/or the surrounding atmosphere. In any event, the tension members 44 and their concentration rings effectively retain each cell 62 in a predetermined position within the envelope so that displacement or longitudinal shifting of the cells and change in the buoyancy and trim of the airship will not occur accidentally or by reason of any operation or maneuvering of the craft.

The power plant and propulsion means 12 employed as motive power for the airship may also be suspended from the concentration rings 46 and positioned in any desired location for convenience in use and access and for ease of control and operation of the airship. However, the design and construction of the airship framework embodying the present invention renders it possible to support and position the propeller or propulsion means directly in line with the central longitudinal axis 14 of the airship framework. Arrangements of this character serve to simplify control and operation of the airship and greatly improve the aerodynamic efficiency of the design since the boundary layer thickness and air pressure differentials adjacent the surface of the envelope are reduced. Moreover, the thrust of the propulsion means is aligned with the longitudinal axis of the airship and is not eccentric thereto as in the prior art. Accordingly, the propulsion means is located in alignment with the centers to which the load carried by the airship is transmitted. Such alignment of the load and thrust with the axis of the framework serves to distribute and equalize the forces applied throughout substantially the entire length and circumference of the framework. Excessive and localized stresses are thereby eliminated and the strength and weight of each individual element of the framework can be reduced substantially.

Figure 5:
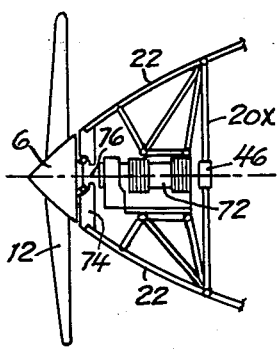
FIG. 5 is a vertical sectional view illustrating a typical form of propulsion means for airships embodying the present invention.
Figure 7:
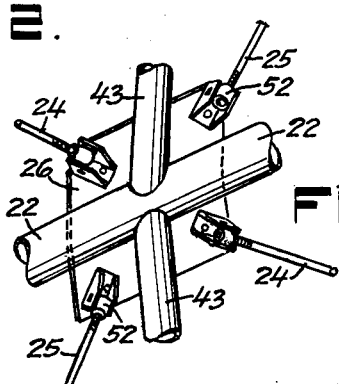
FIG. 7 is a perspective illustrating a typical form of gusset plate which may be used in the assembly of FIGS. 1 and 2.

As shown in FIG. 5, the power plant, which may be an electric motor, internal combustion engine, turbine, jet means or the like, is indicated at 72 and may be mounted within the airship envelope between the last ring assembly 20X of the framework and the tail cone 6 of the airship. The tail cone has a thrust body 74 to which the rear ends of the longerons 22 of the airship frame are secured. The propeller 12 is carried by a shaft 76 centered with respect to the tail cone 6 and supported by a bearing or other suitable means carried by the thrust body whereby the thrust exerted by the propeller 12 or other propulsion means is exerted directly on the thrust body 74. The thrust body 74, in turn, serves to transmit the thrust to the longerons in a direction lengthwise of the longerons and preferably serves to distribute the thrust substantially uniformly to all of the longerons throughout the circumference of the framework. Moreover, the thrust is transmitted to the framework of the airship in alignment with the longitudinal axis 14 of the envelope so that mechanical stresses on the framework are reduced and a lighter weight structure may be employed.

The power plant 72 which actuates the propeller may also be centered with respect to the airship framework and supported by the rear ring assembly 20X as shown. However, this is not necessary since the power plant itself will not ordinarily exert any thrust on the airship or its framework. Nevertheless, the construction provided permits such arrangement of the power plant, thrust body and propulsion means whereby substantial simplification in driving connections, transmission mechanism, speed reducing means, clutches, etc. can be effected.

Location of the propeller 12 on the axis of the envelope of the airship not only overcomes the objections due to the use of eccentrically located propulsion means of the prior art but also simplifies the control and operation of the airship. The rudders and elevators can then be centered with respect to the propulsion means to assure balanced operation and functioning thereof. At the same time, boundary layer control and aerodynamic efficiency of the airship are greatly improved and the speed of flight may be increased with substantial economies in fuel consumption.

The airship and its novel framework as described above are characterized by their great strength, flexibility and simplicity of construction while the weight of the framework is greatly reduced as compared with that heretofore required or used in rigid-type lighter-than-air craft. As a result, the size of the airship can be reduced and its pay load capacity can be increased. Moreover, its speed and the efficiency of operation and ease of control extend the uses and applications of rigid-type lighter-than-air craft for both civilian and military purposes and for both passenger and freight transportation.

The particular framework assembly described and shown in the drawings has many advantages and characteristics and the elements thereof are capable of use either alone or in other combinations and arrangements and in other and alternative assemblies. Thus, for example, the primary ring assemblies shown and described above may be used in combination with other heavier or more conventional ring assemblies and may be variously spaced or positioned in selected locations in the framework where desired or of particular advantage. Further, if desired, the framework may embody one or more longitudinally extending keels as shown at 80 in FIG. 1 while still employing primary ring assemblies of the character herein described. Each or any of the primary or supplemental ring assemblies in the framework may be made of any suitable type and may be formed of material such as aluminum or alloy tubing, extruded, or fabricated beams, strips, or structural assemblies, with or without internal bracing. In a similar way, the tension members may be formed of wire, rod, strips or elements which are either rigid or flexible. Moreover, it is not necessary that each or any of the concentration rings 46 at the center of the primary ring assemblies 20 be employed as a load supporting means. They may instead serve solely or primarily as hub means for distributing or balancing the forces applied to various portions of the ring assembly or for strengthening the framework as required for any particular design or loading of the airship.

The cells for the buoyant gas and their arrangement within the outer envelope and the construction composition and form of the outer envelope may be varied as desired or preferred in any particular airship. Thus, the cells 62 need be only partially inflated and the temperature or condition of the gas therein may be varied as desired to control the operation of the airship or for any other purpose. Therefore, even though the airship is referred to as being "lighter-than-air," this may not always or even generally be literally true.

The outer envelope 2 of the airship may be rigid or formed of metal or other material although it is generally preferable to employ fabric, plastic or other flexible material as a covering for the framework. Moreover, if desired, the outer covering may be thermally insulated or otherwise treated or used in combination with elements for controlling or varying the temperature, humidity or other conditions of the buoyant or other gas within the envelope.

It will thus be apparent that airships, frameworks, power plants and other combinations and arrangements of elements in rigid-type lighter-than-air craft embodying the present invention may be varied considerably and used in numerous alternative combinations and relations. In view thereof, it should be understood that the particular embodiment of the invention shown in the drawings and described above is intended to be illustrative only and is not intended to limit the scope of the invention.

I claim:

1. An elongated framework for lighter-than-air craft comprising a plurality of longitudinally spaced ring-shaped assemblies centered with respect to the longitudinal axis of said framework and lying in parallel planes normal to said axis, longerons extending lengthwise of the framework and connected to said ring-shaped assemblies at spaced points about the circumference thereof, king posts having their outer ends fixedly connected to said ring-shaped assemblies, said king posts having their inner ends extending radially inward from the ring-shaped assemblies, bracing members carried by said framework and connected to each of said king posts at a point thereon intermediate the ends of the king post, flexible tension elements connected to the inner ends of said king posts and extending radially inward from said posts to points adjacent the longitudinal axis of the framework, and a common member located adjacent the longitudinal axis of said framework to which said tension elements are connected.

2. An elongated framework for lighter-than-air craft comprising a plurality of longitudinally spaced ring-shaped assemblies centered with respect to the longitudinal axis of the framework and lying in parallel planes normal to said axis, longerons extending lengthwise of the framework and connected to said ring-shaped assemblies at spaced points about the circumference thereof, each ring-shaped assembly having a plurality of king posts carried thereby with the outer end of each king post fixedly connected to said ring-shaped assembly at one of said spaced points about the circumference of the ring-shaped assembly, the inner end of each king post extending radially inward from the ring-shaped assembly, bracing members connected to said ring-shaped assembly and to a point on each of said king posts intermediate the ends of the king post, flexible tension elements having their outer ends connected to the inner ends of said king posts and extending radially inward from the inner ends of said king posts toward the longitudinal axis of the framework, and common means positioned adjacent the longitudinal axis of the framework to which the inner ends of said tension elements are connected.

3. Framework for lighter-than-air craft as defined in claim 2 wherein load supporting means other than said tension elements are connected to said common means positioned adjacent the longitudinal axis of the framework and to a load to be carried by the aircraft.

4. An elongated framework for lighter-than-air craft including a ring-shaped assembly centered with respect to the longitudinal axis of said framework and lying in a plane normal to said axis, longerons extending lengthwise of said framework and connected to said ring-shaped assembly at spaced points about the circumference thereof, a concentration ring located substantially at the center of said ring-shaped assembly and adjacent the longitudinal axis of the framework, and means connected to said ring-shaped assembly and to said concentration ring cooperating to oppose distortion of said ring-shaped assembly and excessive axial displacement of said concentration ring with respect to said ring-shaped assembly, said means comprising a plurality of king posts each of which extends radially inward from the ring-shaped assembly toward the longitudinal axis of the framework, each king post functioning as a second class lever wherein the full length of the king post constitutes the effort arm of the lever, the outer end of the king post is fixedly connected to the ring-shaped assembly as a fulcrum, and the framework has bracing means thereon connected to the king post between the outer fulcrum end of the king post and the inner end thereof serving to establish a resistance arm for the king post second class lever which is substantially less than the distance between said fulcrum and the inner end of the king post, and flexible tension elements connected to said concentration ring and to the inner end of each of said king posts.

5. A rigid-type lighter-than-air craft having an elongated envelope, a framework located within said envelope and including ring-shaped assemblies centered with respect to the longitudinal axis of the envelope, flexible tension elements connected to said ring-shaped assemblies and extending radially inward therefrom toward said axis, said tension elements having their inner ends connected to common means located adjacent said axis, and load supporting means other than said tension elements having one part thereof connected to said common means and having another part thereof connected to a load to be carried by the craft.

6. A rigid-type lighter-than-air craft having an elongated envelope, a framework located within said envelope and including ring-shaped assemblies centered with respect to the longitudinal axis of the envelope, flexible tension elements having the outer ends thereof connected to said ring-shaped assemblies and extending radially inward from said ring-shaped assemblies toward said axis, common means located adjacent said axis to which the inner ends of said tension elements are connected, a load receiving compartment, and load supporting means other than the tension elements connected at one end thereof to said common means and connected at another point thereon to said load receiving compartment in a manner to suspend said compartment and its load directly from said common means.

7. A rigid-type lighter-than-air craft as defined in claim 6 wherein propulsion means are carried by said framework and positioned substantially in alignment with the longitudinal axis of said envelope and the common means from which the load receiving compartment is suspended.

8. Lighter-than-air craft having an elongated envelope, a framework within said envelope embodying a plurality of longitudinally spaced ring assemblies centered with respect to the longitudinal axis of said envelope, longerons connected to said ring assemblies adjacent the periphery thereof, securing means on adjacent ring assemblies in the framework located adjacent the connection between the ring assemblies and said longerons, and frame bracing wires extending generally parallel to the surface of said envelope and located within the envelope, said bracing wires extending diagonally with respect to the axis of the envelope from the securing means adjacent the point of connection of a longeron to one of said ring assemblies to the securing means adjacent the point of connection of an adjacent longeron to an adjacent ring assembly, said frame bracing wires being provided with adjustable means for placing the wires under sufficient tension to resist displacement of said ring assemblies and longerons with respect to each other.

9. Lighter-than-air craft having an elongated envelope, a framework within said envelope embodying a plurality of longitudinally spaced ring assemblies centered with respect to the longitudinal axis of said envelope, longerons connected to said ring assemblies adjacent the periphery thereof, securing means on adjacent ring assemblies in the framework located adjacent the points of connections between the ring assemblies and said longerons, and frame bracing wires extending generally parallel to the surface of said envelope and located within said envelope, said bracing wires extending diagonally with respect to the axis of the envelope, said bracing wires each having one end thereof connected to the securing means adjacent the point of connection of a longeron to one of said ring assemblies and having the opposite end thereof connected to the securing means adjacent the point of connection of an adjacent longeron to an adjacent ring assembly, said frame bracing wires having oppositely directed threads thereon and means engaging said threads for placing said wires under sufficient tension to resist displacement of said ring assemblies and longerons with respect to each other.

References Cited in the file of this patent

UNITED STATES PATENTS

| 1,580,182 | Valkenberg | Apr. 13, 1926 |
| 1,673,481 | Arnstein | June 12, 1928 |

FOREIGN PATENTS

| 483,606 | Great Britain | Apr. 22, 1938 |
| 195,110 | Great Britain | Mar. 29, 1923 |